TAPE DRIVE ASSEMBLY

Filed July 9, 1962 2 Sheets-Sheet 1

TAPE DRIVE ASSEMBLY

Filed July 9, 1962 2 Sheets-Sheet 2

INVENTORS.
ROBERT G. NORDMAN
HARRY F. RAYFIELD
BY Christie, Parker & Hale
ATTORNEYS.

United States Patent Office 3,147,901
Patented Sept. 8, 1964

3,147,901

TAPE DRIVE ASSEMBLY

Robert G. Nordman, Pasadena, and Harry F. Rayfield, Arcadia, Calif., assignors to Burroughs Corporation, Detroit, Mich., a corporation of Michigan Filed July 9, 1962, Ser. No. 208,371
14 Claims. (Cl. 226—176)

This invention is directed to improvements in apparatus for selectively driving tape in magnetic tape transports, and, more particularly, to a novel tape drive assembly for driving tape in an unvarying straight line.

In magnetic tape transports employed in digital computer systems, information is written on or read from magnetic tape by driving the tape through an operational zone under and in contact with one or more read-write magnetic heads. The digital information recorded on the surface of the tape lies in tracks substantially parallel to the edges of the tape. Thus, to accurately write on or read from the tape, it is necessary that the tape be directed along an unvarying straight line path under the magnetic head or heads in the operational zone. To accomplish this, tape transports generally include extensive guiding arrangements for controlling the lateral positioning of the moving tape within the transport. In addition, it is necessary that the apparatus for driving the tape be capable of directing the tape along a straight path.

Generally, in tape transports, the means for driving the magnetic tape takes the form of a pair of capstan drive assemblies, one positioned at either side of the operational zone. Each capstan drive assembly includes a rotating capstan drive roller spaced from one surface of the tape, a pinch roller spaced from an opposite surface of the tape, and an electromagnet arrangement for moving the pinch roller into engagement with the tape and thereby pinching the tape tightly into driving contact with the capstan drive roller.

Since the capstan and pinch rollers take the form of cylinders, it is necessary, in order to drive the tape in a straight line, that the axes of the rollers be parallel to each other and lie in a common plane when the rollers are contacting the tape. To move the pinch roller into such engagement with the magnetic tape, the pinch roller is usually coupled to a pivot arm. The pivot arm is then rotated by operation of the electromagnetic arrangement to move the pinch roller in engagement with the magnetic tape over the capstan drive roller.

Such capstan drive assemblies, although providing a straight line drive for the magnetic tape, generally possess a large mass and inertia. Thus, the rate at which a capstan drive assembly employing a pivoted pinch roller may be selectively energized to drive and release tape is strictly limited.

Due to the limitation in the rate of operation of the pivoted pinch roller capstan drive assembly, capstan drive assemblies have been designed which provide a straight line drive for the pinch roller in engaging the magnetic tape over the capstan drive roller. Although such drive assemblies are capable of high frequency actuation, they generally utilize linear bearing arrangements to guide the pinch roller into the necessary aligned engagement with the magnetic tape parallel to the capstan roller. Linear bearing arrangements, however, are expensive and difficult to construct and accurately align. Thus, capstan drive assemblies employing straight line drive of the pinch roller have found only limited use in magnetic tape transports.

Due to the expense and problems of alignment of linear bearing arrangements, attempts have been made to design straight line actuated capstan drive assemblies employing other than linear bearings. Such efforts, in the past, however, have resulted in assemblies which are still relatively expensive and also require frequent adjustment which, in practice, is very difficult to achieve with the necessary high degree of accuracy. As a result such assemblies tend, rather than driving tape along a straight line path, to skew the tape as it passes under the magnetic head thereby resulting in the missing of recorded information as well as inaccurate writing of information on the moving magnetic tape in the operational zone.

The present invention provides a novel and relatively inexpensive capstan drive assembly capable of high frequency actuation and which is readily adjustable to drive tape along an unvarying straight line path.

Structurally, to accomplish this capstan drive assembly basically includes a capstan drive roller positioned adjacent one surface of a tape in a tape transport. Spaced from an opposite surface of the tape is a pinch roller. The pinch roller is coupled to a shaft for free rotary movement about its axis of rotation. The shaft, in turn, is supported normal to the axis of rotation of the pinch roller within central openings in first and second diaphragm members. The diaphragm members are, in turn, supported by a frame member adjacent opposite ends of the shaft. The first diaphragm which is positioned adjacent the pinch roller, lies in a plane parallel to the axis of rotation of the capstan roller and is manually adjustable within the plane to adjust the axis of rotaion of the pinch roller to lie in a common plane with the axis of rotation of the capstan roller. The second diaphragm, which is located adjacent the opposite end of the shaft, also lies in a plane parallel to the axis of roation of the capstan roller and includes a relatively large central opening. Extending around the shaft are means for clamping the shaft within the central opening in the second diaphragm. The clamping means are manually adjustable such that the shaft may be moved laterally within the opening, to adjust the axis of rotation of the pinch roller to lie parallel to the axis of rotation of the capstan roller, as well as normal to the opening, to adjust the spacing between the pinch roller and the capstan roller. Stationed around the shaft and supported at one end by the first diaphragm is a precompressed spring member. Contacting the opposite end of the spring member and extending around the shaft is a movable member. The movable member extends along the shaft to a point adjacent the clamping means. Supported by the frame member at opposite sides of the movable member along the shaft are means defining first and second stop members for limiting the travel of the movable member along the shaft toward the first and second diaphragm, respectively, and means for selectively attracting the movable member to the first and second stop members.

In operation the movable member is normally attracted to the second stop member. In this state the pinch roller is spaced from the capstan roller, and the movable member contacts the clamping means. To cause the pinch roller to engage the surface of the tape to tightly pinch the tape against the capstan roller, the movable member is attracted towards the first stop member. In traveling to the first stop member, the movable member presses against the precompressed spring causing a downward deflection of the diaphragm and movement of the shaft carrying the pinch roller toward the capstan roller. When the pinch roller initially pinches the tape against the capstan roller the movement of the shaft substantially ceases. The movable member, however, continues its travel to the first stop member. Such movement further compresses the spring to press the pinch rollers tightly against the capstan roller with a predetermined spring force thereby allowing rotary movement of the capstan roller to drive the tape between the capstan roller and the pinch roller.

When the movable member is again attracted to the second stop member the compressed spring suddenly releases to rapidly accelerate the movable member, first, into contact with the clamping means forcing the shaft and pinch roller away from the capstan roller, and then, to the second stop member. Due to the attraction of the movable member to the second stop member, the movable member does not rebound, but rather remains fixed in that position until again attracted to the first stop member to cause the pinch roller to engage the tape.

In this manner, the present invention, by employing a pair of diaphragm members to support a shaft coupled to the pinch roller, provides a relatively inexpensive, highly stable, and rugged capstan drive assembly which is manually adjustable to accurately align the axis of rotation of the pinch roller to lie in a common plane with and parallel to the axis of rotation of the capstan roller.

Further, in the capstan drive assembly, the drive of the pinch roller is through the precompressed spring member. The pinch roller, in contacting the tape, thus provides an extremely rapid, yet controlled, cushioned pinching of the tape against the capstan roller to rapidly drive the tape without unnecessary damage and wear to the surfaces of the tape caused by the excessive pinching forces normally associated with capstan drive assemblies. Also, by proper selection of the spring member, uniform drive control of the pinch roller may be maintained in each assembly constructed in accordance with the present invention.

The above, as well as other features of the present invention, may be more clearly understood by reference to the following detailed description when considered with the drawings in which.

Figure 1:
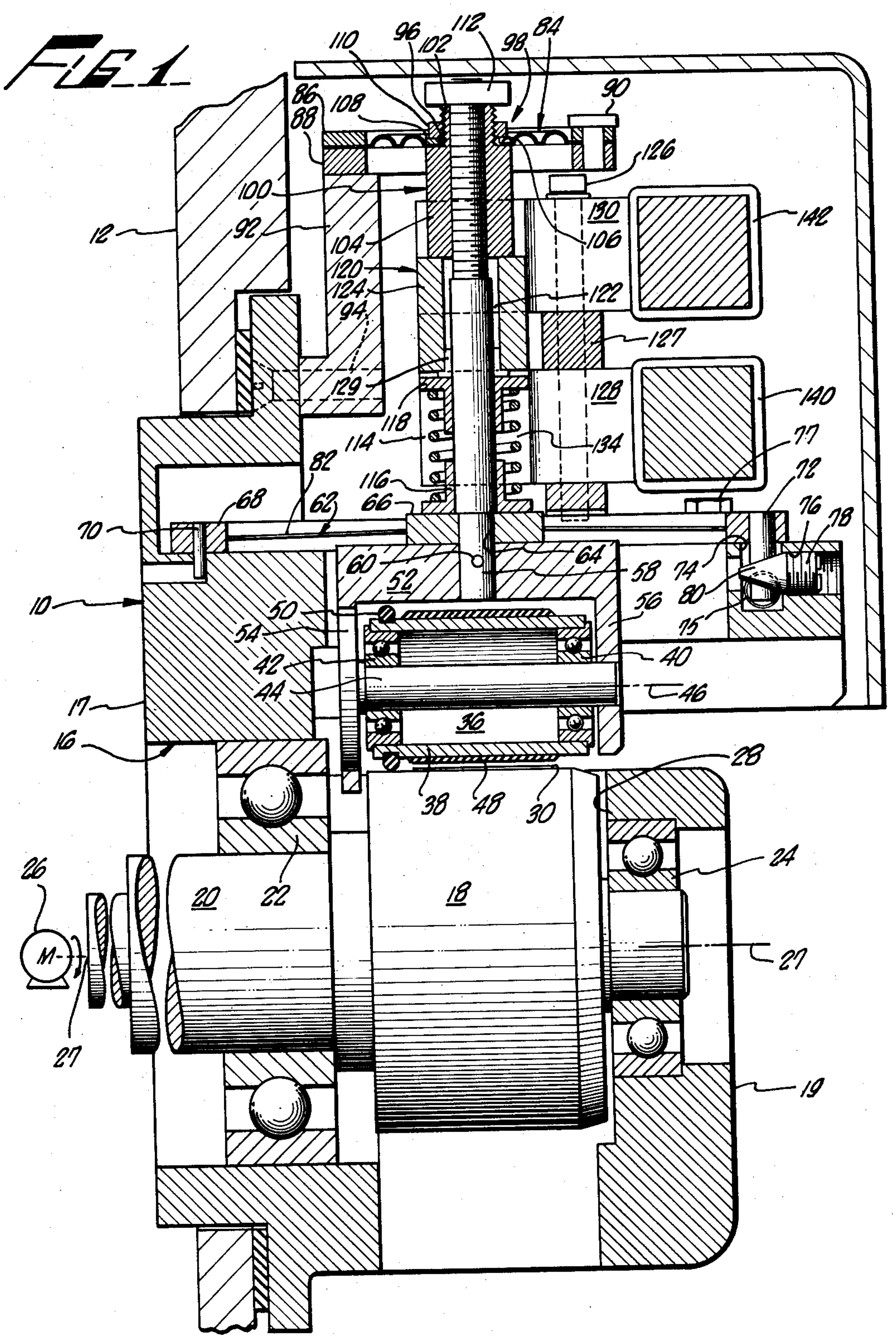
FIGURE 1 is a sectional side view of a preferred form of the capstan drive assembly of the present invention.

As represented, the capstan drive assembly of the present invention, in its preferred form, includes a supporting frame member represented generally as 10. The frame member 10 is adapted for mounting within a tape transport adjacent the operational zone thereof by coupling to the mounting panel 12 of the tape transport. Such coupling, by way of example, may be by a plurality of screw members such as 14 represented in FIGURE 2.

The frame member 10 includes an opening 16. The opening 16 extends from the rear face 17 of the frame member 10 with stepped variations in its radial dimensions to the front face 19 of the frame member.

Supported within the opening 16 is a capstan roller 18. The capstan roller 18 is coupled to a drive shaft 20. The drive shaft 20, in turn, is supported for free rotation with the capstan roller 18 within the opening 16 by a pair of bearing arrangements 22 and 24, which, as illustrated in FIGURE 1, are located on either side of the capstan roller 18. The drive shaft 20 is coupled to a motor 26 which imparts a driving rotary movement to the shaft 20 and the capstan roller 18 about the common axis of rotation 27.

Figure 2:
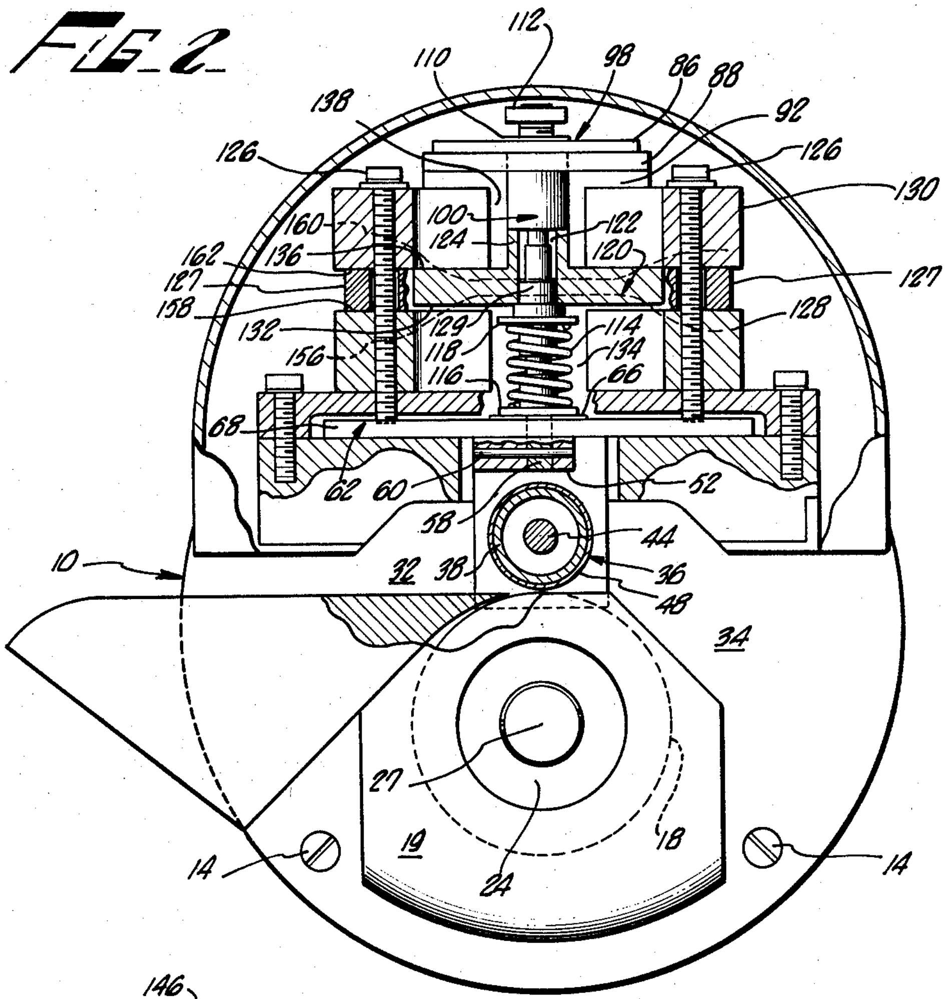
FIGURE 2 is a sectional front view of the capstan drive assembly illustrated in FIGURE 1.

The capstan roller 18, as described above, is so positioned as to extend slightly through an opening 28 in the frame member 10 to a point adjacent the lower surface of a strip of magnetic tape 30 which is being directed to the operational zone in the tape transport. As illustrated in FIGURE 2, the frame member 10 extends around the capstan roller 18 adjacent the opening 28 to define laterally extending surfaces 32 and 34 immediately adjacent the surface of the capstan roller 18. The surfaces 32 and 34 are spaced along the circumference of the roller on the opposite sides of the tangent point of the capstan roller 18 and the lower surface of the tape 30. The surfaces 32 and 34, by their close spacing to the rotating surface of the capstan roller 18, limit the exposure of the capstan surface to the tape and thereby provide means for preventing the strip of the tape 30 in passing over and in contact with the capstan roller 18, from adhering to the capstan roller and wrapping therearound as might be caused by static charge attraction of the magnetic tape from the surface of the capstan roller as it drives the tape in the tape transport.

The rotary movement of the capstan roller 18 adjacent to and in contact with the lower surface of the tape 30 is not, in and of itself, sufficient to drive the tape 30 within the tape transport, as is well known in the art. To provide means whereby the rotary movement of the capstan roller 18 drives the magnetic tape 30, the drive assembly includes a pinch roller represented generally by the reference numeral 36, positioned above the upper surface of the tape 30. The pinch roller 36 preferably includes a length of tubing 38 supported at either end by bearing arrangements 40 and 42 to extend around a transversely extending shaft 44. Due to the bearing arrangements 40 and 42, the pinch roller tube 38 is free to rotate about the axis 46 of the shaft 44 which thereby defines the axis of rotation for the pinch roller 36. The tube 38 is surrounded by a sleeve of rubber-like material 48 for providing a resilient contact of the pinch roller 36 with the upper surface of the magnetic tape 30. Extending around the circumference of the tube 38 is an O-ring 50 preferably composed of a resilient material. The pinch roller 36 is normally spaced so the O-ring contacts the surface of the capstan roller 18. Thus, rotation of the capstan roller 18 produces a rotary movement of the pinch roller 36 when the pinch roller 36 proper is above the upper surface of the tape 30.

The shaft 44 associated with the pinch roller 36 is coupled to a mounting member 52 which, as illustrated, takes the form of a forked member having side elements 54 and 56 extending downward on either side of the pinch roller 36. The side element 54 extends adjacent the frame member 10 and fixedly supports one end of the shaft 44 while the side element 56 extends along an opposite side of the pinch roller 36 to support an opposite end of the shaft 44.

In order to drive the strip of tape 30 in an unvarying straight line, it is necessary that when the pinch roller 36 contacts the upper surface of the tape 30 that the axis of rotation 46 lie in a common plane and substantially parallel to the axis of rotation 27 of the capstan roller 18. In order to provide such alignment as well as a straight line drive of the pinch roller 36 into contact with the magnetic tape over the capstan roller 18, the present invention includes a shaft member 58 coupled by a pin 60 to the mounting member 52. The shaft member 58 extends substantially normal to the axis of rotation 46 of the pinch roller 36.

Supported by the frame member 10 substantially parallel to the axis of rotation 27 of the capstan roller 18 and extending adjacent the mounting member 52 is a diaphragm member 62. The diaphragm member 62 includes a central opening 64 for receiving the shaft member 58. The central opening 64 is surrounded by an internal hub portion 66 of the diaphragm 62 which rests on the upper surface of the mounting member 52. Extending around the circumference of the diaphragm member 62 and forming an integral part thereof is a rim member 68. The rim member 68 is supported by the frame member 10 and coupled thereto at a single pivot point by a pin member 70. At an opposite side of the diaphragm member 62, relative to the pin member 70, is a second pin 72. The pin 72 extends downward into a slot 74 in the frame member 10. Positioned in the slot 74 is a spring member 75 for exerting a lateral force on the pin 72 tending to rotate the diaphragm 62 about the pin 70. Adjacent the slot 74 and communicating therewith is a horizontally extending threaded hole 76. Extending within the hole 76 is a screw member 78 having an inwardly tapered end section 80 contacting the pin member 72 on a side remote from the spring 75. Manual rotary movement of the screw 78 into and out of the threaded hole 76 thus rotates the diaphragm member 62 about the pivot pin 70 within the plane parallel to the axis of rotation 27 of the capstan roller 18. Such pivoting movement of the diaphragm member 62 produces a like pivoting movement of the pinch roller 36 to align the axis of rotation 46 of the pinch roller 36 to lie in a common substantially vertical plane with the axis of rotation 27 of the capstan roller 18. After adjustment of the diaphragm member 62, as described, it is clamped to the frame member 10 by tightening a plurality of screw members such as 77 which extend through the rim 68.

Intermediate to the hub 66 and the rim 68 of the diaphragm member 62 is an annular portion 82 of reduced cross sectional area. The annular portion 82 is flexible in a plane substantially normal to its surface, thereby allowing movement of the diaphragm member 62 with the shaft member 58 in a plane substantially normal to the axis of rotation of the capstan roller 18. Although the diaphragm member 62 is flexible in a plane parallel to the surface of the annular portion 82, it possesses a high torsion characteristic and resists deflection in any plane other than that normal to its surface. Accordingly, the diaphragm member 62 provides guiding support for the shaft 58 and hence the pinch roller 36 in a straight line normal to the diaphragm member 62, thereby acting as a simplified form of linear bearing arrangement.

To provide manual alignment of the axis of rotation 46 of the pinch roller 36 to lie in a plane parallel to the axis of rotation 27 of the capstan roller 18, as well as a clamping of the end of the shaft member 58 remote from the pinch roller 36, the present invention includes a second diaphragm member 84. The extremities of the diaphragm 84 are clamped between a pair of ring members 86 and 88 by a plurality of screws, such as 90. The ring members 86 and 88 are, in turn, coupled to a supporting element 92 which is coupled to the frame member 10 by a screw 94 as illustrated in FIGURE 1. The ring members 86 and 88 lie in a plane substantially parallel to the axis of rotation 27 of the capstan roller 18. Thus, the diaphragm member 84 clamped therebetween also lies in a plane substantially parallel to the axis of rotation 27. The diaphragm member 84 possesses a central opening 96 for receiving an upper end of the shaft member 58. The central opening 96 is large relative to the cross section of the shaft member 58. Thus, the end of the shaft member 58 may be manually moved within the opening 96 to effectively tilt the pinch roller 36 to align the axis of rotation 46 to lie parallel to the axis of rotation 27 of the capstan roller 18.

Having aligned the axis of rotation 46 to lie in a common plane and parallel to the axis of rotation 27 of the capstan roller 18, the shaft member 58 may be fixedly clamped within the opening 96 by a clamping arrangement illustrated and identified generally by the reference numeral 98.

As illustrated, the upper end of the shaft member 58 is externally threaded. Extending around the shaft 58 is an internally threaded sleeve member 100. The sleeve member 100 mates with the threaded portion of the shaft 58 and extends through the opening 96 in the diaphragm member 84. The portion 102 of the sleeve 100 extending upward through the opening 96 is of reduced radial dimension relative to the portion 104 of the sleeve 100 extending below the opening 96 to define an annular shoulder 106. The diaphragm member 84 rests on the shoulder 106. The portion 102 of the sleeve 100, as illustrated, is also externally threaded. Extending around the portion 102 and resting on an upper surface of the diaphragm 84 supported by the shoulder 106 is a washer member 108. The washer member 108 provides a spacing between the upper surface of the diaphragm 84 and a nut 110 which mates with the threaded portion 102 of the sleeve 100. A tightening of the nut 110 against the washer 108 locks the diaphragm 84 tightly against the shoulder 106 and thus fixes the position of the shaft member 58 within the opening 96 of the diaphragm 84.

Similar to the diaphragm member 62, the diaphragm member 84 possesses a high resistance to torsion forces acting on the diaphragm and effectively limits movement of the shaft 58 in a direction normal to the surface of the diaphragm 84. In this manner the diaphragm member 84 is a supporting member for the remote end of the shaft 58 and acts as a linear bearing arrangement in guiding the movement of the shaft 58 along a straight line substantially normal to the axis of rotation 27 of the capstan roller 18.

To complete the clamping arrangement 98 of the present invention, a lock nut 112 mates with the ends of the threaded portion of the shaft 58. The lock nut 112 is tightened against the end of the threaded portion 102 of the sleeve 100. Dut to the coupling of the lock nut 112 to the shaft 58 manual rotary movement of the sleeve 100 relative to the lock nut 112 produces a raising or lowering of the shaft 58 within the sleeve 100 to move the pinch roller 36 toward and away from the surface of the capstan roller 18 depending upon the direction of rotation of the sleeve member 100. Accordingly, the clamping arrangement 98 of the present invention, in addition to providing means for clamping the shaft member 58 within the opening 96 of the diaphragm 84, also provides means for selectively controlling the spacing between the surface of the pinch roller 36 and the surface of the capstan roller 18. A spacing of substantially six to seven one-thousandths of an inch is normally maintained between the surface of the pinch roller 36 and the surface of the capstan roller 18 to allow free movement of the tape 30 between the capstan roller 18 and the pinch roller 36 when the capstan drive assembly is in an unenergized state.

To drive the pinch roller 36 along a straight line path into aligned engagement with the upper surface of the tape 30 over the capstan roller 18, the present invention includes a precompressed spring member 114 stationed around the shaft 58. The lower end of the spring member 114 is supported by a bushing 116 which, in turn, rests upon the hub portion 66 of the diaphragm member 62. A similar bushing arrangement 118 is positioned at the upper end of the spring member 114 around the shaft 58.

Located above the spring member 114 for pressing against the upper end thereof is a movable member 120. The movable member 120 is preferably composed of a magnetic material and has an opening 122 therein for receiving the shaft 58. As represented in FIGURE 2, the movable member 120 extends from around the shaft laterally in a plane substantially parallel to the rear face 17 of the frame member 10 and includes a collar portion 124 surrounding the opening 122 and extending upward along the outer surface of the shaft 58 to contact the lower end of the sleeve member 100. The length of the sleeve 100 between the point contacting the movable member 120 and the shoulder 106 is also constructed such that the diaphragm member is normally free of any preloading in the plane of the shaft member 58.

Coupled to the frame member 10 by a bolt 126 and sapced from each other by a spacer member 127 are in pair of core members 128 and 130. The core members extend in planes substantially parallel to the diaphragm members 82 and 84. The core member 128 is located below a lower surface 132 of the movable member 120 and is shaped to define an air gap 134 through which the shaft 58 and spring member 114 extend. The core member 130 is located above an upper surface 136 of the movable member 120 and is shaped to define an air gap 138 through which the shaft 58 and collar portion 124 of the movable member 120 extend. The core members 128 and 130 are spaced from each other such that small air gaps normally exist between the upper and lower surfaces, respectively, of the movable member 120 as it is supported by the spring member 114 in contact with the sleeve 100.

To move the pinch roller 36 along a straight line path into and out of contact with the upper surface of the tape 30, the movable member 120 is guided by a bearing 129 and is moved down and up along the shaft 58 to selectively deflect the diaphragm member 62 through the spring member 114.

Figure 3:
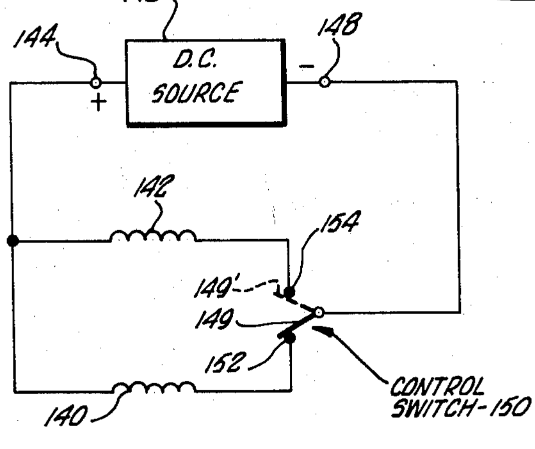
FIGURE 3 is a schematic representation of the control circuitry associated with the selective control of the capstan drive assembly.

To provide such selective movement of the movable member 120, the present invention includes an electrical winding 140 wrapped around the core member 128 and an electrical winding 142 wrapped around the core member 130. As illustrated in FIGURE 3, the windings 140 and 142 are connected in common to an output terminal 144 of a direct current source 146 while a second output terminal 148 of the direct current source 146 is coupled to the movable switch arm 149 of a control switch 150. The switch arm 149 is movable between contacts 152 and 154 which are connected to the windings 140 and 142, respectively. The control switch 150 is illustrated as being manually controllable. However, in practice, the switch may be electronic and controlled by a program control unit associated with the tape transport system employing the capstan drive assembly of the present invention.

By way of example only, the potential developed at the output terminal 144 of the direct current source 146 is illustrated as being of a positive polarity relative to the potential developed at the output terminal 148. Thus, when the switch arm 149 is contacting the contact 152, current flows from the output terminal 144 through the winding 140 to the output terminal 148.

Current flowing through the winding 140 develops a magnetic field in the magnetic core member 128, a portion of the flux path of which is represented by the dotted line 156 in FIGURE 2. The magnetic field attracts the movable member 120 toward the upper surface 158 of the core 128. The force acting on the movable member 120 to attract it to the core 128 is transmitted by the compressed spring member 114 to the diaphragm member 62 causing the diaphragm to deflect along a plane normal to its surface. The deflection of the diaphragm member 62 carries the shaft 58 downward along a straight line path toward the capstan roller 18 which, in turn, moves the pinch roller 36 into contact with the upper surface of the tape 30.

Upon contact of the pinch roller 36 with the upper surface of the tape 30, the downward movement of the shaft 58 substantially ceases. The movable member 120, however, continues to move into contact with and adheres to the upper surface 158 of the core 128. In this manner the upper surface of the core 128 acts as a stop member for the downward travel of the movable member 120 along the shaft 58.

The movement of the movable member 120 after the shaft 58 has ceased to move, further compresses the spring member 114 to tightly press the pinch roller 36 against the upper surface of the tape 30 with a force dependent upon the amount of precompression of the spring member 114. In this state, rotary movement of the capstan roller 18 drives the tape 30 along an unvarying straight line path from between the capstan roller 18 and the pinch roller 36.

When the switch arm 149 is closed at contact 154, as represented by the dotted line 149′ in FIGURE 3, current ceases to flow in the winding 140 causing a collapse of the magnetic field in the core 128. Current instead flows from the output terminal 144 of the direct current source 146 through the winding 142 to the terminal 148. Current flowing in the winding 142 develops a magnetic field in the core member 130, a portion of the flux path of which is represented by the dotted line 160 in FIGURE 2. The magnetic field attracts the movable member 120 toward the lower surface 162 of the core 130. The movement of the movable member 120 toward the core 130 is accelerated by the release of the compressed spring member 114. In travelling toward the core 130, the collar portion 124 of the movable member contacts the lower surface of the sleeve 100 to urge the shaft 58 and the pinch roller 36 away from the upper surface of the tape 30. The movable member 120 then contacts the lower surface 162 of the core member 130 and adheres thereto due to the magnetic attraction of the core 130 for the movable member 120. In this manner, the lower surface of the core 130 acts as a stop member for limiting the upward travel of the movable member 120 along the shaft 58.

Accordingly, as described above, selective control of the switch 150 attracts the movable member 120 toward the cores 128 and 130 to move the pinch roller 36 into and out of contact with the upper surface of the tape 30. Since the movable member 120 is positively held by the core members 128 and 130, rebound of the movable member against the spring 114 is prohibited. Thus, the bouncing action common in other capstan drive assemblies is prevented from occurring in the present invention.

In addition, due to the support provided by the diaphragm members 62 and 84, the shaft 58 and the pinch roller 36 are mounted for straight line guided movement toward and away from the capstan drive roller 18. Also, due to the adjustable diaphragm arrangement of the present invention, the pinch roller 36 is manually adjustable such that the axis of rotation 46 lies in a common plane substantially parallel to the axis of rotation 27 of the capstan roller, thereby providing straight line driving of the magnetic tape 30 upon pressure contact of the pinch roller 36 with the tape 30.

Further, in the capstan drive assembly, the straight line drive of the pinch roller 36 is through the spring member 114. The pinch roller 36, in contacting the tape 30, thus provides an extremely rapid, yet controlled, cushioned pinching of the tape 30 against the capstan roller 18. This provides a rapid driving of the tape by rotation of the capstan roller 18 without unnecessarily damaging or wearing the surfaces of the tape as is commonly caused by the excessive pinching forces normally associated with capstan drive assemblies.

In addition, the rapidity of the drive movement imparted to the tape 30, is improved by having the pinch roller 36 rotating at the speed of the capstan roller 18 when the pinch roller engages the tape. This is accomplished by the O-ring 50 which continuously contacts the surface of the capstan roller 18 and which is readily compressed by the pinching action of the pinch roller against the capstan roller.

What is claimed is:

1. Apparatus for selectively driving a tape in a tape transport, comprising:

a capstan drive roller supported by a frame member for rotary movement around its axis of rotation adjacent a surface of the tape;

a pinch roller adapted for free rotation about its axis of rotation;

a shaft;

mounting means for coupling the pinch roller to the shaft such that the shaft extends substantially normal to the axis of rotation of the pinch roller and the pinch roller is free to rotate about its axis of rotation adjacent an opposite surface of the tape;

a first diaphragm member supported by the frame member to lie in a plane substantially parallel to the axis of rotation of the capstan roller, the first diaphragm member having an opening therein for receiving the shaft adjacent the mounting means;

manually-controllable means for moving the first diaphragm within its plane to adjust the axis of rotation of the pinch roller to lie in a common plane with the axis of rotation of the capstan roller;

a second diaphragm member supported by the frame member to lie in a plane substantially parallel to the first diaphragm member, the second diaphragm having an opening therein for receiving an end of the shaft remote from the mounting means, the opening in the second diaphragm being large relative to the cross section of the shaft whereby the shaft may be manually moved within the opening to adjust the axis of rotation of the pinch roller to lie parallel to the axis of rotation of the capstan;

manually adjustable means coupled to the shaft for clamping the shaft within the opening in the second diaphragm member and for adjusting the spacing between the pinch roller and the capstan;

a spring member having one end supported by the first diaphragm;

a movable member for pressing against an opposite end of the spring member;

means defining first and second stop members for stopping the movement of the movable member along the shaft, the first stop member being between the movable member and the first diaphragm member and the second stop member being between the movable member and the second diaphragm member;

means for selectively attracting the movable member to the first and second stop members, the movable member, in being attracted to the first stop member pressing against the spring member to cause a deflection of the first diaphragm member which forces the pinch roller to pinch the tape tightly against the capstan roller;

and means coupled to the shaft for contacting the movable member as it travels from the first stop member to the second stop member to cause the movement of the movable members to move the pinch roller out of contact with the tape.

2. Apparatus for selectively driving a tape in a tape transport, comprising:

a frame member for mounting in the tape transport;

a capstan drive roller supported by the frame member for driving rotation around its axis of rotation immediately adjacent a surface of the tape;

a pinch roller adapted for free rotation about its axis of rotation;

a shaft member;

mounting means for coupling the pinch roller to the shaft member such that the shaft member extends substantially normal to the axis of rotation of the pinch roller and the pinch roller is free to rotate about its axis of rotation adjacent an opposite surface of the tape;

a first diaphragm member supported by the frame member to lie in a plane substantially parallel to the axis of rotation of the capstan roller, the first diaphragm member having an opening therein for receiving the shaft member adjacent the mounting means;

manually controllable means for pivoting the first diaphragm member about a pivot point in the plane of the first diaphragm to adjust the axis of rotation of the pinch roller to lie in a common plane with the axis of rotation of the capstan roller;

a second diaphragm member supported by the frame member to lie in a plane substantially parallel to the first diaphragm member, the second diaphragm member having an opening therein for receiving an end of the shaft member remote from the mounting means, the opening in the second diaphragm being large relative to the cross section of the shaft member whereby the shaft member may be manually moved within the opening to adjust the axis of rotation of the pinch roller to lie parallel to the axis of rotation of the capstan roller;

manually adjustable means coupled to the shaft member for clamping the shaft member within the opening in the second diaphragm and for adjusting the spacing between the pinch roller and the capstan roller;

a precompressed spring member supported at one end by the first diaphragm member;

a movable member for pressing against an opposite end of the spring member;

means supported by the frame member defining first and second stop members for stopping the movement of the movable member along the shaft, the first stop member being between the movable member and the first diaphragm member and the seocnd stop member being between the movable member and the second diaphragm member;

means for selectively attracting the movable member to the first and second stop members, the movable member, in being attracted to the first stop member, pressing against the spring to cause a deflection of the first diaphragm and force the pinch roller to pinch the tape tightly against the capstan roller;

and means coupled to the shaft for contacting the movable member as it travels from the first stop member to the second stop member to cause the movement of the movable member to move the pinch roller out of engagement with the capstan roller.

3. The apparatus defined in claim 2 wherein the end of the shaft extending immediately to either side of the opening of the second diaphragm is externally threaded and wherein the manually adjustable means includes an internally threaded sleeve mating with the threaded portion of the shaft and extending through the opening in the second diaphragm, the portion of the sleeve extending to a side of the second diaphragm remote from the pinch roller being of a reduced radial dimension to define a shoulder with the portion of the sleeve extending to a side of the second diaphragm facing the pinch roller, the second diaphragm resting on the shoulder, the portion of reduced radial dimension being externally threaded, a clamping nut mating with the externally threaded portion of the sleeve for engaging and clamping the second diaphragm member to the shoulder, thereby securing the shaft within the opening in the second diaphragm member, and a lock nut mating with the threaded portion of the shaft to abut the end of the threaded portion of the sleeve locking the sleeve in place on the shaft such that rotary movement of the sleeve relative to the lock nut moves the shaft and hence the pinch roller toward and away from the capstan roller depending upon the direction of rotation of the sleeve, and wherein the sleeve member comprises the means coupled to the shaft for contacting the movable member as it travels from the first stop member to the second stop member.

4. The apparatus defined in claim 2 including means defining a surface immediately adjacent the surface of the capstan drive roller at a point spaced slightly around the circumference of the capstan roller from a point immediately adjacent the surface of the tape for preventing moving tape which may adhere to the surface of the capstan roller from wrapping around the capstan roller.

5. The apparatus defined in claim 2 including a ring of compressible material extending tightly around the circumference of the pinch roller for continuously contacting the surface of the capstan roller whereby the pinch roller continuously rotates with the capstan roller.

6. Apparatus for selectively driving a tape in a tape transport, comprising:

a frame member for mounting in the tape transport;

a capstan drive roller supported by the frame member for driving rotary movement around its axis of rotation adjacent a surface of the tape;

a pinch roller adapted for free rotation about its axis of rotation;

a shaft member;

mounting means for coupling the pinch roller to the shaft such that the shaft extends substantially normal to the axis of rotation of the pinch roller and the pinch roller is free to rotate about its axis of rotation adjacent to an opposite surface of the tape;

a first diaphragm member supported by the frame member to lie in a plane substantially parallel to the axis of rotation of the capstan roller, the first diaphragm member having an opening therein for receiving the shaft member adjacent the mounting means;

manually-controllable means for moving the first diaphragm within the plane to adjust the axis of rotation of the pinch roller to lie in a common plane with the axis of rotation of the capstan roller;

a second diaphragm member supported by the frame member to lie in a plane substantially parallel to the first diaphragm member, the second diaphragm member having an opening therein for receiving an end of the shaft member remote from the mounting means, the opening in the second diaphragm member being large relative to the cross section of the shaft whereby the shaft may be manually moved within the opening to adjust the axis of rotation of the pinch roller to lie in a plane parallel to the axis of rotation of the capstan roller;

manually adjustable means coupled to the shaft for clamping the shaft within the opening in the second diaphragm member and for adjusting the spacing between the pinch roller and the capstan roller;

a precompressed spring member stationed around the shaft with one end supported by the first diaphragm member;

a movable member composed of a magnetic material guided by the shaft for pressing against the opposite end of the spring member;

a first body of magnetic material supported by the frame member adjacent a surface of the movable member facing the first diaphragm member;

an electrical conductor wrapped around the first body;

a second body of magnetic material supported by the frame member adjacent a surface of the movable member facing the second diaphragm member;

an electrical conductor wrapped around the second body;

means for selectively applying an electrical signal to the electrical conductors on the first and second bodies to selectively attract the movable member to the first and second bodies, respectively, the movable member, in being attracted to the first body, pressing against the spring member to cause a deflection of the first diaphragm which forces the pinch roller to pinch the tape tightly against the capstan roller;

and means coupled to the shaft for contacting the movable member as it travels from the first body to the second body to cause a movement of the movable member to move the pinch roller away from the capstan roller.

7. Apparatus for selectively driving a tape in a tape transport, comprising:

a capstan drive roller supported by a frame member for driving rotation around its axis of rotation immediately adjacent a surface of the tape;

a pinch roller adapted for free rotation about its axis of rotation;

a shaft;

mounting means for coupling the pinch roller to the shaft such that the shaft extends substantially normal to the axis of rotation of the pinch roller and the pinch roller is free to rotate about its axis of rotation;

support means coupled to the shaft for normally supporting the pinch roller for straight-line guided movement into and out of contact with the surface of the tape opposite to the capstan roller, the pinch roller normally being supported by the support means spaced from the opposite surface of the tape and with its axis of rotation substantially parallel to the axis of rotation of the capstan roller;

a spring member having one end supported by the mounting means;

a movable member for pressing against an opposite end of the spring member;

means defining first and second stop members for stopping the movement of the movable member along the shaft, the first stop member being between the movable member and the mounting means and the second stop member being between the movable member and an end of the shaft remote from the mounting means;

means for selectively attracting the movable member to the first and second stop members, the movable member, in being attracted to the first stop member compressing the spring against the mounting member to force the pinch roller to pinch the tape tightly against the capstan roller;

and means coupled to the shaft for contacting the movable member as it travels from the first stop member to the second stop member to cause a movement of the movable member to draw the pinch roller out of contact with the tape.

8. The apparatus defined in claim 7 wherein the support means includes a pair of diaphragm members having openings therein for receiving the shaft and means for clamping the shaft within the openings.

9. The apparatus defined in claim 7 wherein the means defining the first and second stop members includes first and second bodies of magnetic material having an electrical conductor wrapped around each body of magnetic material and wherein the means for selectively attracting the movable member to the first and second stop members includes means for selectively applying an electrical signal to the electrical conductors wrapped around the first and second bodies of magnetic material.

10. Apparatus for selectively driving tape in a tape transport, comprising:

a capstan drive roller supported by a frame member for driving rotary movement about its axis of rotation adjacent to a surface of a tape;

a pinch roller adapted for free rotary movement about its axis of rotation;

mounting means for supporting the pinch roller for straight-line guided movement into and out of contact with an opposite surface of the tape, the pinch roller normally being supported by the mounting means spaced from the opposite surface of the tape and with its axis of rotation substantially parallel to the axis of rotation of the capstan roller;

a precompressed spring member for exerting a predetermined spring force on the pinch roller along the straight line toward the capstan roller;

a movable member for pressing against the spring member along the straight line to transmit a force to the pinch roller, causing the pinch roller to move into contact with the opposite surface of the tape;

selectively operable means for exerting a force on the movable member;

and means coupled to the pinch roller for contacting the movable member to move the pinch roller out of contact with the tape.

11. Apparatus for selectively driving a tape in the tape transport, comprising:

a capstan drive roller supported for driving rotary movement around its axis of rotation adjacent to a surface of the tape;

a pinch roller adapted for free rotation about its axis of rotation;

mounting means for supporting the pinch roller for straight-line guided movement into and out of contact with an opposite surface of the tape, the pinch roller normally being supported by the mounting means spaced from the opposite surface of the tape with its axis of rotation substantially parallel to the axis of rotation of the capstan roller;

a spring member for exerting a spring force on the pinch roller along the straight line toward the capstan roller to cause the pinch roller to move into contact with the opposite surface of the tape;

a movable member for compressing the spring along the straight line to exert the spring force on the pinch roller;

means defining first and second stop members for limiting the travel of the movable member, the first stop member lying between the movable member and the pinch roller and the second stop member lying on the side of the movable member remote from the pinch roller;

means for selectively attracting the movable member to the first and second stop members, the movable member, in traveling to the first stop member compressing the spring member along the straight line to exert the spring force on the pinch roller;

and means coupled to the pinch roller for contacting the movable member as it travels from the first stop member to the second stop member to cause the movement of the movable member to move the pinch roller out of contact with the opposite surface of the tape.

12. Tape apparatus, comprising:

a rotatable capstan;

a drive roller spaced from the capstan and adapted to be moved into and out of driving engagement with the capstan for driving tape therebetween;

a shaft for suspending the drive roller adajacent the capstan;

first adjustable means coupled to the shaft for independently moving the shaft and thereby the drive roller in a single plane to align the drive roller with the corresponding plane of the capstan;

and second adjustable means independently coupled to the shaft for moving the shaft and thereby the drive roller in a plane orthogonally related to the plane of movement afforded by the first adjustable means to align the drive roller with the corresponding plane of the capstan.

13. Tape apparatus comprising:

a capstan rotatable about its axis of rotation;

a drive roller rotatable about its axis of rotation and adapted to be moved into and out of driving engagement with the capstan for driving tape therebetween;

a shaft for suspending the drive roller adjacent to the capstan;

a diaphragm means adjustably coupled to the shaft for independently rotating the shaft and thereby the drive roller in a horizontal plane of movement to align the drive roller axis in a single common plane with the axis of the capstan; and an adjustable means surrounding the shaft for moving the shaft and thereby the drive roller in a plane orthogonally related to the movement afforded by the adjustable diaphragm means to align the drive roller axis in a substantially parallel relationship with the capstan axis.

14. Tape apparatus comprising:

a rotatable capstan;

a drive roller spaced from the capstan and adapted to be moved into and out of driving engagement with the capstan for driving tape therebetween;

a shaft for suspending the drive roller adjacent the capstan;

a first and second adjustable means comprising a pair of diaphragms that are manually and independently adjustable for positioning the drive roller in a parallel relationship with the capstan;

the first adjustable means being coupled to the shaft for independently moving the shaft and thereby the drive roller in a single plane to align the drive roller with the corresponding plane of the capstan; and, the second adjustable means being independently coupled with the shaft for moving the shaft and thereby the drive roller in a plane orthogonally related to the plane of movement afforded by the first adjustable means to align the drive roller with the corresponding plane of the capstan.

References Cited in the file of this patent

UNITED STATES PATENTS 2,012,130 Kellogg ---------------- Aug. 20, 1935
2,796,781 Mills ------------------ June 25, 1957
2,990,092 Begun et al. ----------- June 27, 1961